United States Patent
Taki et al.

(10) Patent No.: US 9,752,898 B2
(45) Date of Patent: Sep. 5, 2017

(54) MAGNETIC ENCODER AND MANUFACTURING METHOD THEREOF

(71) Applicant: NAKANISHI METAL WORKS CO., LTD., Osaka-shi (JP)

(72) Inventors: Masayuki Taki, Osaka (JP); Mitsuru Saitoh, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 208 days.

(21) Appl. No.: 14/707,305

(22) Filed: May 8, 2015

(65) Prior Publication Data

US 2015/0354989 A1 Dec. 10, 2015

(30) Foreign Application Priority Data

Jun. 4, 2014 (JP) .................................. 2014-115404
Mar. 31, 2015 (JP) .................................. 2015-071054

(51) Int. Cl.
| | |
|---|---|
| *G06F 1/16* | (2006.01) |
| *G01P 3/48* | (2006.01) |
| *G01D 5/20* | (2006.01) |
| *B29C 45/14* | (2006.01) |
| *F16C 41/00* | (2006.01) |
| *G01P 3/44* | (2006.01) |

(Continued)

(52) U.S. Cl.
CPC ....... *G01D 5/2006* (2013.01); *B29C 45/1418* (2013.01); *B29C 45/1459* (2013.01); *F16C 41/007* (2013.01); *G01D 5/2451* (2013.01); *G01P 3/443* (2013.01); *G01P 3/487* (2013.01); *B29K 2077/00* (2013.01); *B29K 2081/04* (2013.01); *B29K 2105/16* (2013.01); *B29K 2505/12* (2013.01); *B29K 2995/0008* (2013.01); *B29L 2031/752* (2013.01)

(58) Field of Classification Search
CPC .... G01D 5/2006; G01D 5/2451; G01P 3/487; G01P 3/443; F16C 41/007; B29C 45/1459; B29C 45/1418; B29K 2995/0008; B29K 2105/16; B29K 2077/00; B29K 2081/04; B29K 2505/12; B29L 2031/752
USPC ........ 324/173, 207.25; 73/24.06; 361/679.26
See application file for complete search history.

(56) References Cited

U.S. PATENT DOCUMENTS

| 2012/0230621 A1* | 9/2012 | Inoue .................. B60B 27/0005 |
| | | 384/448 |
| 2013/0063138 A1* | 3/2013 | Takahashi ............ G01D 5/2451 |
| | | 324/207.25 |

FOREIGN PATENT DOCUMENTS

| JP | 2003-156059 A1 | 5/2003 |
| JP | 2007-271506 A1 | 10/2007 |

* cited by examiner

Primary Examiner — Farhana Hoque
(74) Attorney, Agent, or Firm — Kratz, Quintos & Hanson, LLP

(57) ABSTRACT

An axial-type magnetic encoder includes an annular fixing member that is fabricated by press molding, and an annular plastic magnet that is attached by injection molding to a sensor-opposed surface of the annular fixing member. When the annular fixing member includes a cylindrical part and an inward flange part extended radially inward from an end edge of the cylindrical part, the magnetic encoder has a high-form accuracy surface on the sensor-opposed surface more radially outward than a range of a diameter (d−2·r) determined by an inner diameter d of the cylindrical part and a radius r of a corner between the cylindrical part and the (Continued)

inward flange part. An outer diameter of the annular plastic magnet is positioned on the high-form accuracy surface.

10 Claims, 9 Drawing Sheets

(51) Int. Cl.
*G01P 3/487* (2006.01)
*G01D 5/245* (2006.01)
*B29K 81/00* (2006.01)
*B29K 77/00* (2006.01)
*B29K 105/16* (2006.01)
*B29K 505/12* (2006.01)
*B29L 31/00* (2006.01)

[Fig. 1]
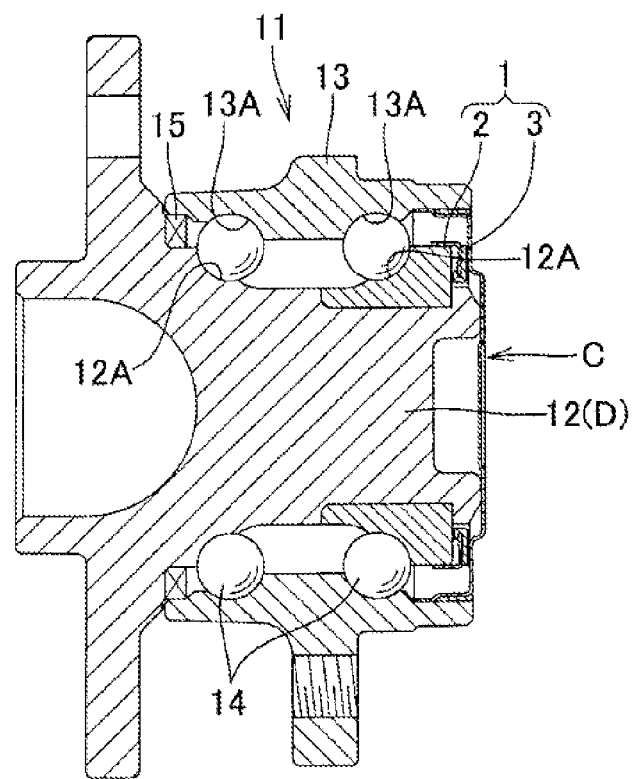

[Fig. 2]
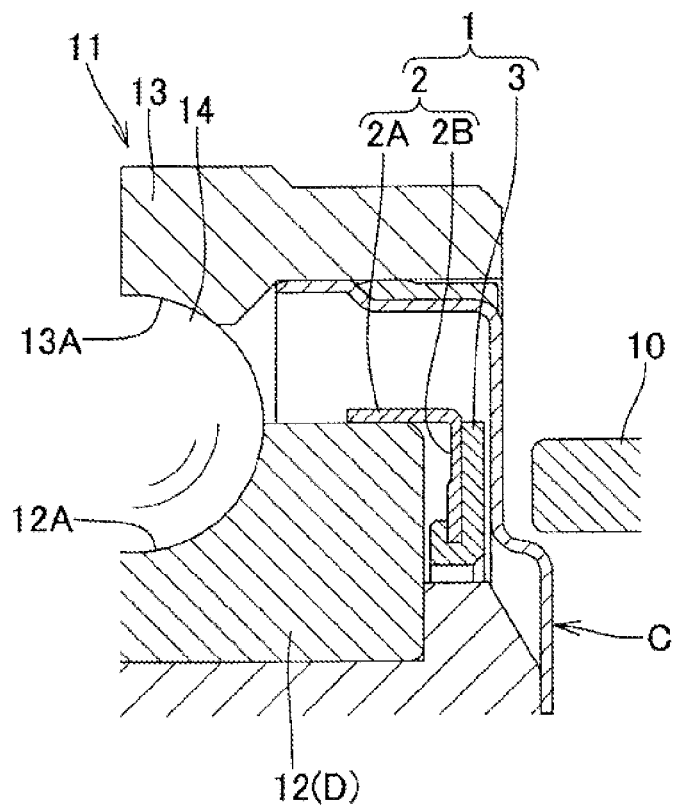

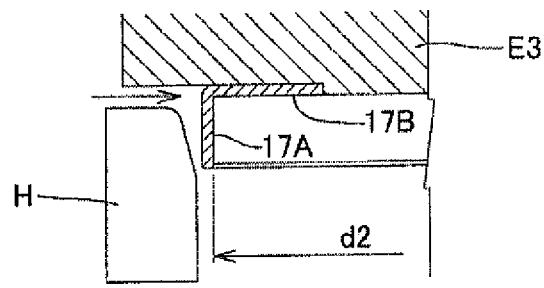
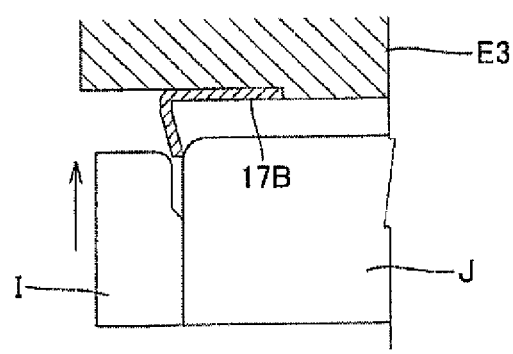
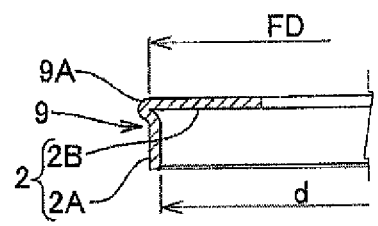
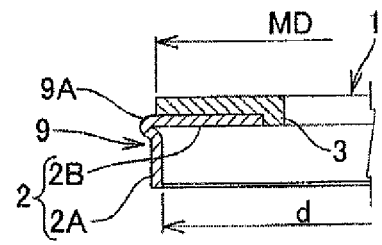

MAGNETIC ENCODER AND MANUFACTURING METHOD THEREOF

TECHNICAL FIELD

The present invention relates to a magnetic encoder that is manufactured by insert molding with a metallic annular fixing member as an insert, and a manufacturing method thereof.

BACKGROUND ART

The magnetic encoder device used to detect the rotating speed (number of rotations) of a rotating body has a variety of number of applications and is composed of: a magnetic encoder including an annular fixing member for attachment to the rotating body and an annular magnet member that is fixed to the fixing member and has N and S poles magnetized circumferentially at regular intervals in a multipolar manner; and a sensor that is attached to a non-rotating body so as to be opposed to the magnet member for detecting rotation of the magnet member.

When the magnetic reading diameter of the sensor is small for a rotating body to which an axial-type magnetic encoder is to be attached, a magnetic encoder used is configured such that an annular fixing member to be fitted to the rotating body is formed by a cylindrical part and an inward flange part that is extended radially inward from an end edge of the cylindrical part, and the annular magnet member is fixed to the inward flange part (for example, refer to Patent Document 1, FIG. 3, and Patent Document 2, FIGS. 1 to 13. Hereinafter, referred to as "inward flange-type magnetic encoder").

CITATION LIST

Patent Literatures

Patent Document 1: JP-A No. 2003-156059
Patent Document 2: JP-A No. 2007-271506

SUMMARY OF INVENTION

Technical Problem

At a conventional inward flange-type magnetic encoder 1A shown in the enlarged vertical cross-sectional view of major components of FIG. 10($a$), magnetic force decreases due to magnetic leakage in a region B1 at an inner diameter side about 1 mm from an outer diameter MD of an annular plastic magnet 3 as an annular magnet member and in a region B2 at an outer diameter side about 1 mm from an inner diameter Md of the annular plastic magnet 3.

Therefore, to widen a magnetic force stable region A, it is necessary to increase the outer diameter MD of the annular plastic magnet 3 as much as possible.

An annular fixing member 2 composed of a cylindrical part 2A and an inward flange part 2B is generally molded by a press process. The flange part 2B has an outer diameter FD of a flat portion with high form accuracy (refer to the enlarged vertical cross-sectional views of major components of FIGS. 10($b$) and 10($c$)) expressed as FD≤(d−2·r). In the following expression, d denotes the inner diameter of the cylindrical part 2A and r the radius of a corner between the cylindrical part 2A and the inward flange part 2B.

When the annular fixing member 2 is set in a metal mold and subjected to an injection molding step for injecting a dissolved plastic magnet material into the metal mold to mold the magnetic encoder 1A, the dissolved plastic magnet material is generally injected into an axial draw-type cavity from a disc gate arranged at the radially inside, considering the orientation of magnetic substance powder in the dissolved plastic.

To widen the magnetic force stable region A shown in FIG. 10($a$), when MD is made larger than FD as shown in FIG. 10($b$), the position of the outer diameter MD of the annular plastic magnet 3 aligns with the metal mold matching surface (PL surface). Accordingly, the PL surface is situated at a low form accuracy round corner between the cylindrical part 2A and the inward flange part 2B. Thus, the dissolved plastic magnet cannot be surely stopped on the PL surface during injection molding. This may lead to occurrence of PL burrs or an edge at the terminal end of the dissolved plastic magnet being charged, thereby causing cracks due to thermal shock or the like.

Therefore, the outer diameter MD of the annular plastic magnet 3 is set to be smaller than the outer diameter FD of the high form accuracy flat surface (MD<FD≤(d−2·r), as shown in FIG. 10($c$).

In addition, the outer diameter MD of the annular plastic magnet 3 becomes further smaller due to molding shrinkage or the like.

In light of the foregoing circumstances, an object of the present invention is to provide a magnetic encoder in which the outer diameter of an annular plastic magnet is increased to widen a magnetic force stable region, and a manufacturing method thereof.

Solution to Problem

To solve the foregoing problem, a magnetic encoder according to the present invention is an axial-type magnetic encoder including: an annular fixing member that has a cylindrical part attached to a rotating body and an inward flange part extended more radially inward than an end edge of the cylindrical part and is fabricated by press molding; and an annular plastic magnet that is attached by injection molding to a sensor-opposed surface of the annular fixing member, wherein, when the annular fixing member is composed of a cylindrical part and an inward flange part extended radially inward from an end edge of the cylindrical part, the magnetic encoder has a high form accuracy surface on the sensor-opposed surface more radially outward than a range of a diameter (d−2·r) determined by an inner diameter (d) of the cylindrical part and a radius (r) of a corner between the cylindrical part and the inward flange part, and an outer diameter of the annular plastic magnet is positioned on the high form accuracy surface (claim 1).

When the annular fixing member is composed of a cylindrical part and an inward flange part extended radially inward from an end edge of the cylindrical part, it is preferred to form the high form accuracy surface on the sensor-opposed surface by performing a press process to press stepwise a back surface of the sensor-opposed surface (claim 2), performing a chamfering press process or stepwise press process to press by surface a round corner between the cylindrical part and the inward flange part (claim 3), or performing a bead process on an annular blank in a concentric manner to form a ribbed portion and then performing a press process to squeeze an outer side of the ribbed portion to mold the annular fixing member, thereby to eliminate the round corner between the cylindrical part and the inward flange part (claim 4).

Alternatively, the high form accuracy surface may be formed on the sensor-opposed surface by performing a press process on a member composed of a large-diameter cylindrical part larger in diameter than the cylindrical part and a large-diameter inward flange part extended radially inward from an end edge of the large-diameter cylindrical part to narrow the large-diameter cylindrical part, and then setting a radially outward portion of the large-diameter inward flange part as an outward projection projecting radially outward (claim 5).

To solve the foregoing problem, a manufacturing method of a magnetic encoder according to the present invention is a manufacturing method of an axial-type magnetic encoder, including: a press molding step of fabricating by press molding an annular fixing member that has a cylindrical part attached to a rotating body and an inward flange part extended more radially inward than an end edge of the cylindrical part; and an injection molding step of, while the annular fixing member is placed in an axial draw mold, injecting a dissolved annular plastic magnet material into the mold, wherein the manufacturing method includes a step of, when the annular fixing member is composed of a cylindrical part and an inward flange part extended radially inward from an end edge of the cylindrical part, forming by a press process a high form accuracy surface on a sensor-opposed surface more radially outward than a range of a diameter (d−2·r) determined by an inner diameter (d) of the cylindrical part and a radius (r) of a corner between the cylindrical part and the inward flange part, and the injection molding step is performed in the state where the annular fixing member is placed in the mold such that a mold matching surface is positioned on the high-accuracy surface (claim 6).

When the annular fixing member is composed of a cylindrical part and an inward flange part extended radially inward from an end edge of the cylindrical part, it is preferred that the press process is a press process by which to press stepwise a back surface of the sensor-opposed surface (claim 7), the press process is a chamfering press process or stepwise press process by which to press by surface a round corner between the cylindrical part and the inward flange part (claim 8), or the press process is a press process by which to subject an annular blank to a bead process in a concentric manner to form a ribbed portion and then squeeze an outer side of the ribbed portion (claim 9).

Alternatively, the press process may be a press process performed on a member composed of a large-diameter cylindrical part larger in diameter than the cylindrical part and a large-diameter inward flange part extended radially inward from an end edge of the large-diameter cylindrical part to narrow the large-diameter cylindrical part and form the cylindrical part (claim 10).

Advantageous Effects of Invention

According to the magnetic encoder and the manufacturing method thereof in the present invention as described above, the axial-type inward flange magnetic encoder is configured such that, when the annular fixing member is composed of a cylindrical part and an inward flange part extended radially inward from an end edge of the cylindrical part, the magnetic encoder has a high form accuracy surface on the sensor opposed surface more radially outward than a range of a diameter (d−2·r) determined by an inner diameter (d) of the cylindrical part and a radius (r) of a corner between the cylindrical part and the inward flange part, and an outer diameter of the annular plastic magnet is positioned on the high form accuracy surface. Therefore, the outer diameter of the annular plastic magnet becomes large to widen a magnetic force stable region.

BRIEF DESCRIPTION OF DRAWINGS

FIG. 1 is a vertical cross-sectional view of an example of a bearing device including a magnetic encoder according to a first embodiment;

FIG. 2 is an enlarged vertical cross-sectional view of major components of the same;

FIG. 3(a) is a vertical cross-sectional view and FIG. 3(b) is a partial vertical perspective view;

FIG. 5(a) shows an annular fixing member and FIG. 5(b) shows the magnetic encoder;

FIG. 6(a) shows an annular fixing member and FIG. 6(b) shows the magnetic encoder;

FIG. 7(a) shows an annular fixing member in process; FIG. 7(b) shows the annular fixing member; and FIG. 7(c) shows the magnetic encoder;

FIGS. 8(a) and 8(b) show an annular fixing member in process; FIG. 8(c) shows the annular fixing member; and FIG. 8(d) shows the magnetic encoder;

FIGS. 9(a), 9(b), 9(c) and 9(d) represent enlarged vertical cross-sectional views of major components of a magnetic encoder according to a sixth embodiment: FIGS. 9(a) and 9(b) show an annular fixing member in process; FIG. 9(c) shows the annular fixing member; and FIG. 9(d) shows the magnetic encoder.

DESCRIPTION OF EMBODIMENTS

Figure 3A:
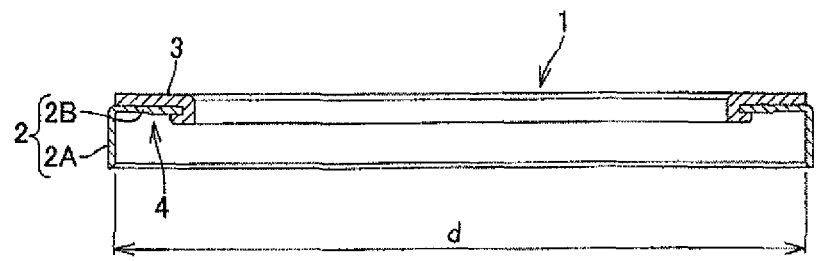
FIGS. 3(a) and 3(b) show the magnetic encoder according to the first embodiment.

Next, embodiments of the present invention will be described below in detail with reference to the attached drawings. The present invention is not limited to the embodiments shown in the attached drawings but includes all of embodiments satisfying the requirements described in the claims.

First Embodiment

As shown in the vertical cross-sectional view of FIG. 1 and the enlarged vertical cross-sectional view of major components of FIG. 2, a bearing device 11 including a magnetic encoder 1 according to the first embodiment of the present invention includes: an inner ring 12 that has an inner ring track surface 12A on an outer peripheral surface; an outer ring 13 that has an outer ring track surface 13A on an inner peripheral surface; a bearing that has rolling elements 14, 14, . . . rolling between the inner ring track surface 12A and the outer ring track surface 13A, and others; the magnetic encoder 1 that is positioned at one axial end part of the bearing and is fixed to the inner ring 12; a sensor 10 that is fixed to the outer ring 13 and opposed to the magnetic pole of the magnetic encoder 1 to detect the rotation of the magnetic encoder 1; a cup-shaped protective cover C that is press-fitted into the outer ring 13 to cover the magnetic encoder 1 and intervenes between the magnetic encoder 1 and the sensor 10; and a seal member 15 that is arranged at the other axial end part of the bearing, and the like.

The interior of the bearing is sealed by the protective cover C and the seal member 15 at the both axial end parts of the bearing, and the magnetic encoder 1 is stored in the interior space. This makes it possible to protect the magnetic encoder 1 and the bearing interior from foreign matter and the like.

In this configuration, a magnetic encoder device is formed by the axial-type magnetic encoder 1 that is attached to the inner ring 12 at the rotary side (rotating body D) and has N and S poles circumferentially alternately magnetized at regular intervals and the sensor 10 that is opposed to the magnetic encoder 1 from the axial direction and attached to the outer ring 13 at the fixed side (non-rotating body).

Figure 3B:
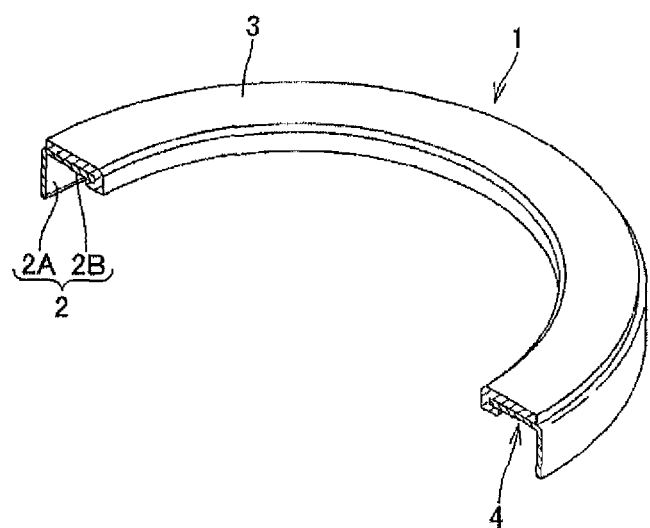
Figure 4A:
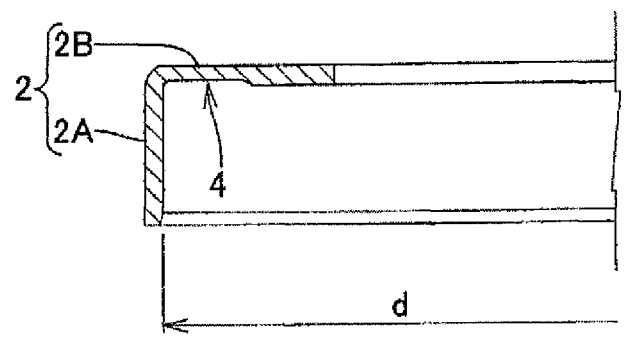
FIG. 4(a) is an enlarged vertical cross-sectional view of major components of an annular fixing member and FIG. 4(b) is an enlarged vertical cross-sectional view of major components of the magnetic encoder.
Figure 4B:
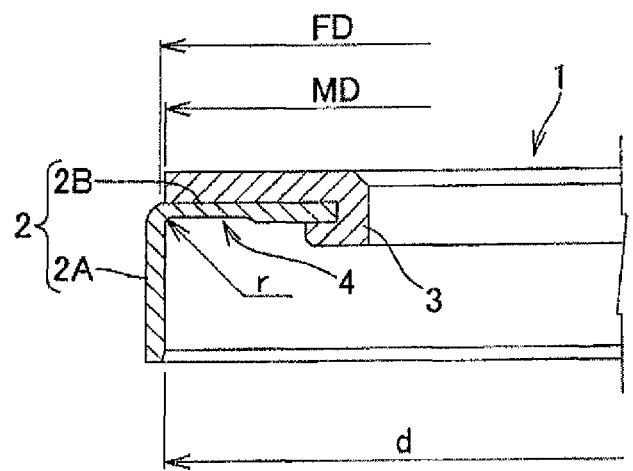

As shown in the vertical cross-sectional view of FIG. 3(a), the partial vertical perspective view of FIG. 3(b), and the enlarged vertical cross-sectional view of major components of FIG. 4(b), the magnetic encoder 1 includes an annular fixing member 2 and an annular plastic magnet 3 attached to the annular fixing member 2.

The annular fixing member 2 is composed of a cylindrical part 2A attached to the inner ring 12 as the rotating body D (refer to FIGS. 1 and 2) and an inward flange part 2B extended radially inward from an end edge of the cylindrical part 2A, and is fabricated from a stainless steel plate material at a press molding step.

The annular plastic magnet 3 is attached to a surface of the annular fixing member 2 opposed to the sensor 10 shown in FIG. 2 (hereinafter, referred to as "sensor-opposed surface") at an injection molding step with the annular fixing member 2 as an insert. Specifically, the annular fixing member 2 and the annular plastic magnet 3 are integrated by applying a thermoset resin adhesive to the surface (sensor-opposed surface) of the annular fixing member 2 to be joined to the annular plastic magnet 3, and placing the annular fixing member 2 and the annular plastic magnet 3 in an axial draw mold, and injecting a dissolved annular plastic magnet material into the mold.

The thermoset resin adhesive may be any adhesive for use in general magnetic encoders and, for example, may be a phenolic resin adhesive, an epoxy resin adhesive, or the like. However, the adhesive is not necessarily used but may be omitted depending on the required specifications and the like.

The annular plastic magnet 3 is made of a magnet material containing magnetic substance powder, a binder, and an additive.

The magnetic substance powder is preferably ferrite-based magnetic powder such as strontium ferrite or barium ferrite, or neodymium- or samarium-based rare-earth magnetic powder.

The binder is preferably a thermoplastic resin material such as polyamides (PA6, PA12, PA612, and the like) or polyphenylene sulfide (PPS).

The additive is preferably an organic additive such as carbon fiber, or an inorganic additive such as glass beads, glass fiber, talk, mica, silicon nitride (ceramic), or crystalline (or non-crystalline) silica.

Figure 10A:
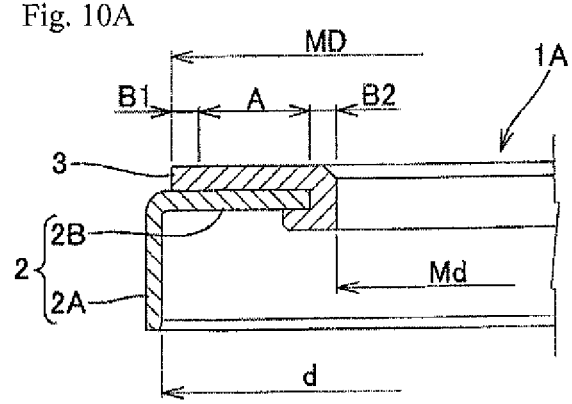
FIGS. 10(a), 10(b) and 10(c) are enlarged vertical cross-sectional views of major components of a conventional magnetic encoder.
Figure 10B:
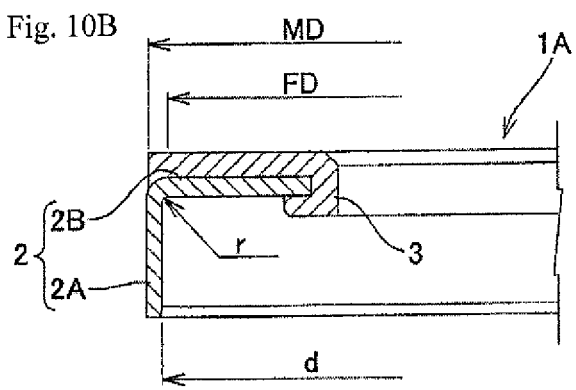
Figure 10C:
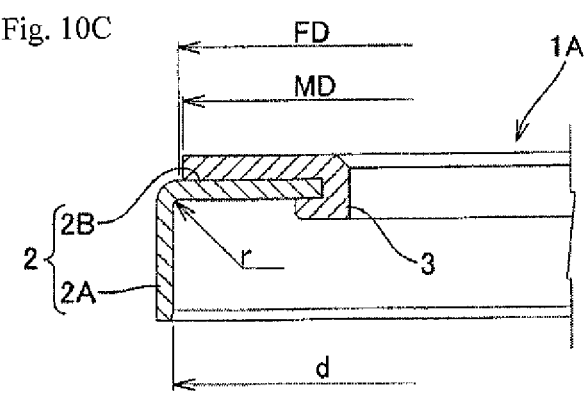

As shown in the enlarged vertical cross-sectional view of major components of FIG. 4(a), a back surface of the sensor-opposed surface of the annular fixing member 2 is pressed stepwise by a press process over a predetermined range smaller than an inner diameter d from the inner diameter d of the cylindrical part 2A, thereby to form a back surface stepwise pressed portion 4 on the back surface. Specifically, the annular fixing member 2 is press-molded by a squeezing process into a general shape as shown in FIGS. 10(a), 10(b) and 10(c), and then the back surface stepwise pressed portion 4 is formed by a press process while the molded article remains along the squeezing die and the backing plate. Since the back surface of the sensor-opposed surface is crushed by the stepwise press process, the excess thickness causes the outer diameter FD of the flat surface with high form accuracy on the sensor-opposed surface to be extended radially outward as shown in the enlarged vertical cross-sectional view of major components of FIG. 4(b). Accordingly, the outer diameter FD is larger than the range of the diameter (d−2·r) determined by the inner diameter d of the cylindrical part 2A and the radius r of the corner between the cylindrical part 2A and the inward flange part 2B (FD>(d−2·r).

Therefore, the metal mold matching surface (PL surface) can be positioned on the high form accuracy flat surface extended radially outward to make the outer diameter MD of the annular plastic 3 larger than that of the annular plastic 3 shown in FIG. 10(c), thereby resulting in a wider magnetic force stable region.

As second to sixth embodiments, modifications of the press process for forming the high form accuracy surface more radially outward than that in the conventional example shown in FIG. 10(c) on the sensor-opposed surface of the annular fixing member 2 will be described below.

Second Embodiment

Figure 5A:
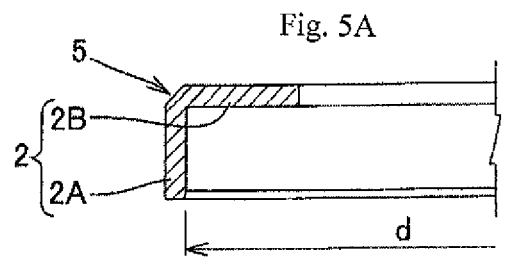
FIGS. 5(a) and 5(b) represent enlarged vertical cross-sectional views of major components of a magnetic encoder according to a second embodiment.

The annular fixing member 2 is press-molded by a squeezing process into a general shape as shown in FIGS. 10(a), 10(b) and 10(c), and then a chamfering press process is performed to press by surface the round corner between the cylindrical part 2A and the inward flange part 2B of the annular fixing member 2 to form a round corner chamfered portion 5 as the high form accuracy surface on the sensor-opposed surface as shown in the enlarged vertical cross-sectional view of major components of FIG. 5(a).

Figure 5B:
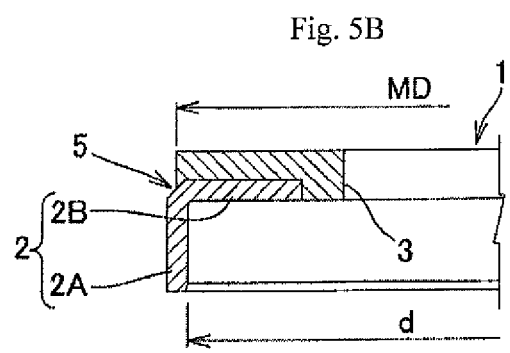

Accordingly, as shown in the enlarged vertical cross-sectional view of major components of FIG. 5(b), the metal mold matching surface (PL surface) can be positioned on the round corner chamfered portion 5 as the high form accuracy surface to make the outer diameter MD of the annular plastic 3 larger than that of the annular plastic 3 shown in FIG. 10(c), thereby resulting in a wider magnetic force stable region.

Third Embodiment

Figure 6A:
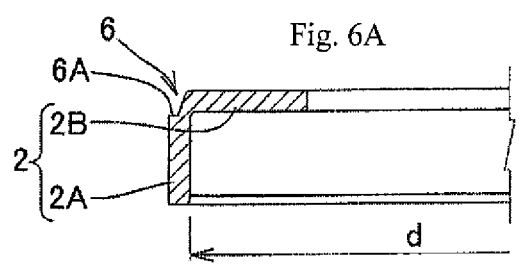
FIGS. 6(a) and 6(b) represent enlarged vertical cross-sectional views of major components of a magnetic encoder according to a third embodiment.

The annular fixing member 2 is press-molded by a squeezing process into a general shape as shown in FIGS. 10(a), 10(b) and 10(c), and then a stepwise press process is performed to press stepwise the round corner between the cylindrical part 2A and the inward flange part 2B of the annular fixing member 2 to form a round corner stepwise pressed portion 6 as the high form accuracy surface on the sensor-opposed surface as shown in the enlarged vertical cross-sectional view of major components of FIG. 6(a).

Figure 6B:
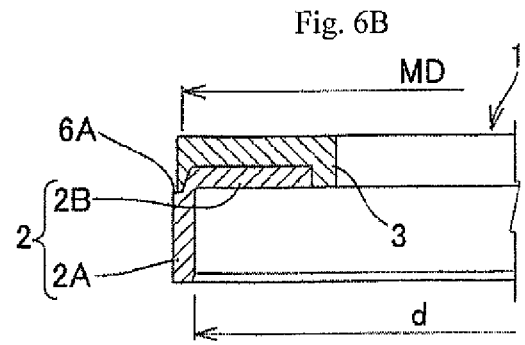

Accordingly, as shown in the enlarged vertical cross-sectional view of major components of FIG. 6(b), the metal mold matching surface (PL surface) can be positioned on a flat portion 6A of the round corner stepwise pressed portion 6 as the high form accuracy surface to make the outer diameter MD of the annular plastic 3 larger than that of the annular plastic 3 shown in FIG. 10(c), thereby resulting in a wider magnetic force stable region.

Fourth Embodiment

Figure 7A:
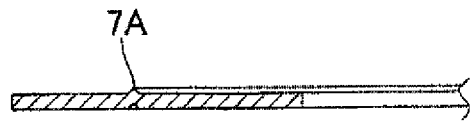
FIGS. 7(a), 7(b) and 7(c) represent enlarged vertical cross-sectional views of major components of a magnetic encoder according to a fourth embodiment.
Figure 7B:
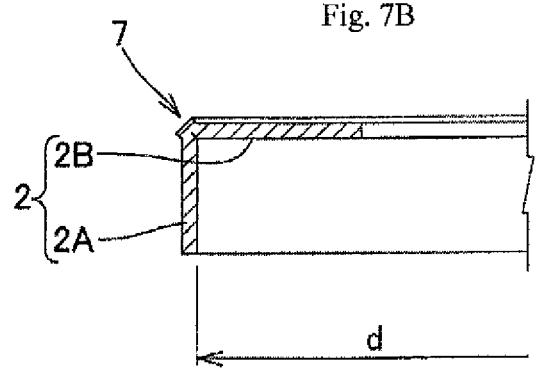

As shown in the enlarged vertical cross-sectional view of major components of FIG. 7(a), an annular blank is subjected to a bead process in a concentric manner to form a ribbed portion 7A, and then the ribbed portion 7A is subjected to a press process to squeeze an outer side of the ribbed portion 7A, thereby to mold the annular fixing member 2 shown in the enlarged vertical cross-sectional view of major components of FIG. 7(b).

The thus press-molded annular fixing member 2 has no round corner between the cylindrical part 2A and the inward flange part 2B, and has a bead processed/squeezed portion 7 formed as the high form accuracy surface.

Figure 7C:
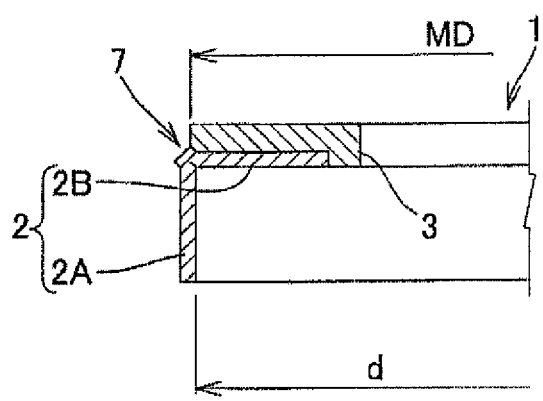

Accordingly, as shown in the enlarged vertical cross-sectional view of major components of FIG. 7(c), the metal mold matching surface (PL surface) can be positioned on the bead processed/squeezed portion 7 as the high form accuracy surface to make the outer diameter MD of the annular plastic 3 larger than that of the annular plastic 3 shown in FIG. 10(c), thereby resulting in a wider magnetic force stable region.

Fifth Embodiment

Figure 8A:
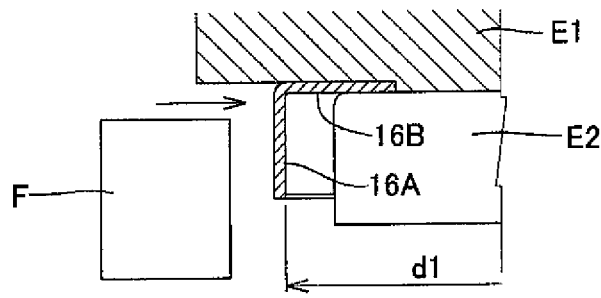
FIGS. 8(a), 8(b), 8(c) and 8(d) represent enlarged vertical cross-sectional views of major components of a magnetic encoder according to a fifth embodiment.
Figure 8B:
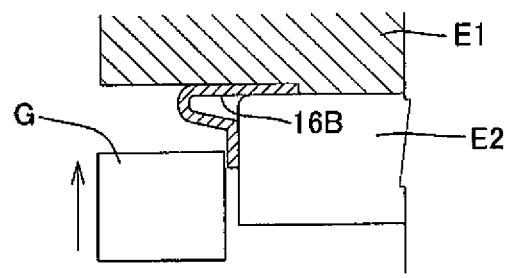
Figure 8C:
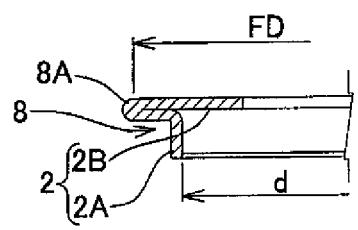

As shown in the enlarged vertical cross-sectional view of major components of FIG. 8(a), a member composed of a large-diameter cylindrical part 16A larger in diameter (inner diameter d1>d) than that of the cylindrical part 2A shown in the enlarged vertical cross-sectional view of major components of FIG. 8(c) and a large-diameter inward flange part 16B extended radially inward from an end edge of the large-diameter cylindrical part 16A is fixed to a fixed metal mold E1, and then a narrowing process is performed to press a movable metal mold F against the fixed metal mold E2 from the radially outward direction, thereby to reduce the large-diameter cylindrical part 16A in diameter.

Next, as shown in the enlarged vertical cross-sectional view of major components of FIG. 8(b), a portion at radially outside of the diameter-reduced cylindrical part is axially pressed by a movable metal mold G to set the radially outside portion of the large-diameter inward flange part 16B as an outward projection 8A projected radially outward relative to a narrowed portion 8 as shown in the enlarged vertical cross-sectional view of major components of FIG. 8(c).

The upper surface of the thus formed outward projection 8A constitutes the high-form accuracy flat surface. The outer diameter FD of the high-form accuracy flat surface shown in FIG. 8(c) is larger than the range of the diameter (d−2·r) determined by the inner diameter d of the cylindrical part 2A and the radius r of the corner on the inner surface between the cylindrical part 2A and the inward flange part 2B shown in FIG. 10(c) (FD>(d−2·r).

Figure 8D:
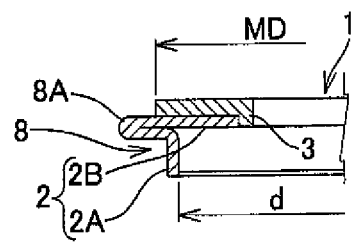

Accordingly, as shown in the enlarged vertical cross-sectional view of major components of FIG. 8(d), the metal mold matching surface (PL surface) can be positioned on the upper surface (sensor-opposed surface) of the outward projection 8A as the high-form accuracy flat surface to make the outer diameter MD of the annular plastic 3 larger than that of the annular plastic 3 shown in FIG. 10(c), thereby resulting in a wider magnetic force stable region.

Sixth Embodiment

As shown in the enlarged vertical cross-sectional view of major components of FIG. 9(a), a member composed of a large-diameter cylindrical part 17A larger in diameter (inner diameter d2>d) than that of the cylindrical part 2A shown in the enlarged vertical cross-sectional view of major components of FIG. 9(c) and a large-diameter inward flange part 17B extended radially inward from an end edge of the large-diameter cylindrical part 17A is fixed to a fixed metal mold E3, and then a movable metal mold H is pressed against the fixed metal mold E3 from the radially outward direction to incline the large-diameter cylindrical part 17A to be more reduced in diameter in a downward direction as shown in the enlarged vertical cross-sectional view of major components of FIG. 9(b).

Next, as shown in the enlarged vertical cross-sectional view of major components of FIG. 9(b), a narrowing process is performed to press movable metal molds I and J against the fixed metal mold E3 from the downward direction to reduce the large-diameter cylindrical part 17A in diameter, thereby to set a radially outside portion of the large-diameter inward flange part 17B shown in the enlarged vertical cross-sectional view of major components of FIG. 9(c) as an outward projection 9A projected radially outward relative to a narrowed portion 9.

The upper surface of the thus formed outward projection 9A constitutes the high-form accuracy flat surface. The outer diameter FD of the high-form accuracy flat surface shown in FIG. 9(c) is larger than the range of the diameter (d−2·r) determined by the inner diameter d of the cylindrical part 2A and the radius r of the corner between the cylindrical part 2A and the inward flange part 2B shown in FIG. 10(c) (FD>(d−2·r).

Accordingly, as shown in the enlarged vertical cross-sectional view of major components of FIG. 9(d), the metal mold matching surface (PL surface) can be positioned on the upper surface (sensor-opposed surface) of the outward projection 9A as the high-form accuracy flat surface to make the outer diameter MD of the annular plastic 3 larger than that of the annular plastic 3 shown in FIG. 10(c), thereby resulting in a wider magnetic force stable region.

As in the foregoing embodiments, the annular fixing member 2 of the present invention may be configured to include the cylindrical part 2A and the inward flange part 2B extended radially inward from the end edge of the cylindrical part 2A as shown in in FIGS. 4(a), 4(b), 5(a), 5(b), 6(a), 6(b), 7(a), 7(b) and 7(c), and may be configured to include the outward projection 8A or 9A at the end edge of the cylindrical part 2A as shown in FIGS. 8(a), 8(b), 8(c) 8(d), 9(a), 9(b), 9(c) and 9(d). That is, the annular fixing member 2 is merely needed to include the cylindrical part 2A and the inward flange part 2B extended more radially inward than the end edge of the cylindrical part 2A.

The shape of the annular fixing member 2 and the dimension of the outer diameter MD of the annular plastic magnet in the foregoing embodiments are selected taking into account material costs, press process costs, required specifications for a magnetic force stable region, and the like.

REFERENCE SIGNS LIST 1, 1A Magnetic encoder
2 Annular fixing member
2A Cylindrical part
2B Inward flange part
3 Annular plastic magnet
4 Back surface stepwise pressed portion
5 Round corner chamfered portion
6 Round corner stepwise pressed portion
6A Flat portion
7 Bead processed/squeezed portion
7A Ribbed portion
8, 9 Narrowed portion
8A, 9A Outward projection
10 Sensor
11 Bearing device
12 Inner ring (rotating body)
12A Inner ring track surface
13 Outer ring
13A Outer ring track surface
14 Rolling element
15 Seal member
16A, 17A Large-diameter cylindrical part
16B, 17B Large-diameter inward flange part
A Magnetic force stable region
B1, B2 Magnetic force reduced region
C Protective cover
D Rotating body
d, d1, d2 Inner diameter of cylindrical part
E1, E2, E3 Fixed metal mold
F, G, H, I, J Movable metal mold
FD Outer diameter of flat surface
MD Outer diameter of magnet
Md Inner diameter of magnet
r Radius of corner

The invention claimed is:

1. An axial-type magnetic encoder, comprising:
an annular fixing member that has a cylindrical part attached to a rotating body and an inward flange part extended more radially inward than an end edge of the cylindrical part and is fabricated by press molding; and
an annular plastic magnet that is attached by injection molding to a sensor-opposed surface of the annular fixing member, wherein
when the annular fixing member is composed of a cylindrical part and an inward flange part extended radially inward from an end edge of the cylindrical part, the magnetic encoder has a high-form accuracy surface on the sensor-opposed surface more radially outward than a range of a diameter (d−2·r) determined by an inner diameter (d) of the cylindrical part and a radius (r) of a corner between the cylindrical part and the inward flange part, and
an outer diameter of the annular plastic magnet is positioned on the high-form accuracy surface.

2. The magnetic encoder according to claim 1, wherein the annular fixing member is composed of a cylindrical part and an inward flange part extended radially inward from an end edge of the cylindrical part, and
the high-form accuracy surface is formed on the sensor-opposed surface by performing a press process to press stepwise a back surface of the sensor-opposed surface.

3. The magnetic encoder according to claim 1, wherein the annular fixing member is composed of a cylindrical part and an inward flange part extended radially inward from an end edge of the cylindrical part, and
the high-form accuracy surface is formed on the sensor-opposed surface by performing a chamfering press process or stepwise press process to press by surface a round corner between the cylindrical part and the inward flange part.

4. The magnetic encoder according to claim 1, wherein the annular fixing member is composed of a cylindrical part and an inward flange part extended radially inward from an end edge of the cylindrical part, and
the high-form accuracy surface is formed on the sensor-opposed surface by performing a bead process on an annular blank in a concentric manner to form a ribbed portion and then performing a press process to squeeze an outer side of the ribbed portion to mold the annular fixing member, thereby to eliminate the round corner between the cylindrical part and the inward flange part.

5. The magnetic encoder according to claim 1, wherein the high-form accuracy surface is formed on the sensor-opposed surface by performing a press process on a member composed of a large-diameter cylindrical part larger in diameter than the cylindrical part and a large-diameter inward flange part extended radially inward from an end edge of the large-diameter cylindrical part to narrow the large-diameter cylindrical part, and then setting a radially outward portion of the large-diameter inward flange part as an outward projection projecting radially outward.

6. A manufacturing method of an axial-type magnetic encoder, comprising:
a press molding step of fabricating by press molding an annular fixing member that has a cylindrical part attached to a rotating body and an inward flange part extended more radially inward than an end edge of the cylindrical part; and
an injection molding step of, while the annular fixing member is placed in an axial draw mold, injecting a dissolved annular plastic magnet material into the mold, wherein
the manufacturing method includes a step of, while the annular fixing member is composed of a cylindrical part and an inward flange part extended radially inward from an end edge of the cylindrical part, forming by a press process a high-form accuracy surface on a sensor-opposed surface more radially outward than a range of a diameter (d−2·r) determined by an inner diameter (d) of the cylindrical part and a radius (r) of a corner between the cylindrical part and the inward flange part, and
the injection molding step is performed in the state where the annular fixing member is placed in the mold such that a mold matching surface is positioned on the high-accuracy surface.

7. The manufacturing method of a magnetic encoder according to claim 6, wherein
the annular fixing member is composed of a cylindrical part and an inward flange part extended radially inward from an end edge of the cylindrical part, and
the press process is a press process by which to press stepwise a back surface of the sensor-opposed surface.

8. The manufacturing method of a magnetic encoder according to claim 6, wherein the annular fixing member is composed of a cylindrical part and an inward flange part extended radially inward from an end edge of the cylindrical part, and the press process is a chamfering press process or stepwise press process by which to press by surface a round corner between the cylindrical part and the inward flange part.

9. The manufacturing method of a magnetic encoder according to claim 6, wherein the annular fixing member is composed of a cylindrical part and an inward flange part extended radially inward from an end edge of the cylindrical part, and the press process is a press process by which to subject an annular blank to a bead process in a concentric manner to form a ribbed portion and then squeeze an outer side of the ribbed portion.

10. The manufacturing method of a magnetic encoder according to claim 6, wherein the press process is a press process performed on a member composed of a large-diameter cylindrical part larger in diameter than the cylindrical part and a large-diameter inward flange part extended radially inward from an end edge of the large-diameter cylindrical part to narrow the large-diameter cylindrical part and form the cylindrical part.

* * * * *